US007369885B2

(12) United States Patent
Shoji

(10) Patent No.: US 7,369,885 B2
(45) Date of Patent: May 6, 2008

(54) RADIO DEVICE AND CELLULAR PHONE HAVING A NOTCH WITH A BENT-BACK PORTION

(75) Inventor: Hideaki Shoji, Chiba (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 533 days.

(21) Appl. No.: 10/749,402

(22) Filed: Jan. 2, 2004

(65) Prior Publication Data

US 2004/0229643 A1 Nov. 18, 2004

(30) Foreign Application Priority Data

Jan. 8, 2003 (JP) ............................. 2003-001756

(51) Int. Cl.
*H04B 1/38* (2006.01)

(52) U.S. Cl. ............................... 455/575.7; 455/575.1; 455/575.5; 455/90.3; 343/700; 343/702; 343/725

(58) Field of Classification Search ............. 455/575.5, 455/575.7, 90, 97, 575.1, 90.3; 343/702, 343/725, 700

See application file for complete search history.

(56) References Cited

U.S. PATENT DOCUMENTS 5,281,765 A * 1/1994 Iura et al. ................ 174/117 F
5,949,377 A * 9/1999 Matsumoto et al. ........ 343/702
6,052,093 A * 4/2000 Yao et al. ................... 343/770
6,223,023 B1 * 4/2001 Kikuchi et al. .......... 455/550.1
6,492,952 B1 * 12/2002 Hu ............................. 343/702
2001/0030627 A1 * 10/2001 Andersson .................. 343/702
2001/0040528 A1 * 11/2001 Vaisanen et al. ..... 343/700 MS
2002/0171587 A1 * 11/2002 Fu ...................... 343/700 MS
2002/0177416 A1 11/2002 Boyle et al.
2003/0038751 A1 * 2/2003 Iwai et al. .................. 343/702
2003/0052827 A1 * 3/2003 Umehara et al. .... 343/700 MS
2003/0103014 A1 * 6/2003 Birnbaum et al. .......... 343/841

FOREIGN PATENT DOCUMENTS

| | | |
|---|---|---|
| EP | 0 343 322 | 11/1989 |
| EP | 1 069 640 | 1/2001 |
| EP | 1 280 226 A1 | 1/2003 |
| JP | 5-110332 | 4/1993 |
| JP | 2793413 | 9/1993 |
| JP | 07-079110 | 3/1995 |

(Continued)

*Primary Examiner*—Matthew Anderson
*Assistant Examiner*—Tuan Pham
(74) *Attorney, Agent, or Firm*—Oblon, Spivak, McClelland, Maier & Neustadt, P.C.

(57) ABSTRACT

Disclosed is a radio device comprising a notch antenna, wherein the notch antenna is comprised of a circuit substrate including a ground portion and a notch portion opened at one end thereof, and a radio circuit portion provided on the circuit substrate for supplying a high-frequency current to the notch portion. In the radio device, a bent-back portion formed so as to be connected to the ground portion and to extend the notch portion is provided on one end side of the circuit substrate. This ensures that the length of the notch antenna is reduced, the size of the antenna can be reduced, antenna efficiency is enhanced, and deterioration of gain due to the influence of a human body can be suppressed.

10 Claims, 8 Drawing Sheets

FOREIGN PATENT DOCUMENTS

| | | |
|---|---|---|
| JP | 09-051223 | 2/1997 |
| JP | 2002-051125 | 2/2002 |
| JP | 2002-237762 | 8/2002 |
| JP | 2002-314330 | 10/2002 |
| JP | 2002-330025 | 11/2002 |
| WO | WO 01/82408 A1 | 11/2001 |

* cited by examiner

RADIO DEVICE AND CELLULAR PHONE HAVING A NOTCH WITH A BENT-BACK PORTION

BACKGROUND OF THE INVENTION

The present invention relates to a radio device and a cellular phone, and particularly to a radio device and a cellular phone with which it is possible to achieve a reduction in size and enhancement of antenna efficiency and gain.

In recent years, in cellular phones, for example, incorporation of an antenna in a casing has been practiced in view of the demand for attaining higher convenience and novel designs. When the antenna is incorporated in the casing, however, it becomes susceptible to interference by the hand, head portion and the like of the human body. As a result, the antenna may possibly be deteriorated conspicuously in gain as compared, for example, with a whip antenna having an element capable of being drawn out of the casing.

As a technology for solving this problem, there have been made some proposals (see, for example, Patent References 1, 2, and 3 set forth below). The technology described in Patent Reference 1 is to physically prevent the hand of the user from covering the incorporated antenna portion by, for example, reducing the thickness of the casing surrounding the antenna.

On the other hand, the technology described in Patent Reference 2 ensures that the radiation direction of an incorporated antenna composed of any of a monopole antenna, an inverted F-type antenna, and a microstrip antenna avoids the side of the surface of the portable apparatus seated on a desk, thereby to render the antenna less susceptible to influences of the hands and metallic bodies and to improve the gain of the antenna.

Further, the technology described in Patent Reference 3, in relation to an antenna composed of a radiating conductor and a ground conductor, is to dispose the ground conductor between the human head portion side and the radiating conductor, thereby reducing the radiation to the human head portion side and improving the gain of the antenna.

Patent Reference 1: Japanese Patent Laid-open No. 2002-51125 (p. 3; FIG. 1)

Patent Reference 2: Japanese Patent Laid-open No. 2002-237762 (pp. 2-3; FIG. 2)

Patent Reference 3: Japanese Patent Laid-open No. Hei 7-79110 (pp. 3-4; FIG. 1)

According to the technology of Patent Reference 1, however, although a gain-improving effect is obtained, the reduction in size of the cellular phone and the design thereof may be damaged.

The technology of Patent Reference 2 is effective in improvement of electric characteristics. However, when a metallic body is placed in the vicinity of the antenna, the antenna characteristics may be deteriorated conspicuously, so that it is impossible to reduce the size of the area surrounding the antenna.

The technology of Patent Reference 3 is based on the assumption that the antenna portion is not covered by a hand, and the technology is an effective approach under the assumed condition. In practice, however, this approach restricts the way the terminal apparatus is held by the user's hand, which is inconvenient. Besides, when the antenna portion is covered with a hand, the radiating conductor is located between the hand and the ground conductor, possibly leading to a marked deterioration of gain.

SUMMARY OF THE INVENTION

The present invention has been made in consideration of the above-mentioned problems involved in the prior art. Accordingly, it is an object of the present invention to provide a radio device with which it is possible to achieve a reduction in size and enhancement of antenna efficiency and gain.

In order to attain the above object, according to one aspect of the present invention, there is provided a radio device including a notch antenna, wherein the notch antenna comprises: a circuit substrate comprising a ground portion and a notch portion opened at one end thereof, and a radio circuit portion provided on the circuit substrate for supplying a high-frequency current to the notch portion. In the radio device, a conductive bent-back portion is formed so as to be connected to the ground portion and to extend the notch portion, on the one end side of the circuit substrate.

According to the radio device of the present invention, the formation of the conductive bent-back portion which extends the notch portion leads to a reduction in the physical length of the notch portion functioning as a notch antenna, and also a reduction in the electrical length of the notch portion. The expression "a reduction in the electrical length of the notch portion" means that the formation of the bent-back portion provides the same effect as that obtained when a capacitor (capacitance) is interposed between the leading end of the bent-back portion and the circuit substrate, and, therefore, the substantial length of the notch portion is reduced. This makes it possible to reduce the size of the radio device and to enhance antenna efficiency.

In accordance with another aspect of the present invention, there is provided a cellular phone including: a casing; a circuit substrate incorporated in the casing and comprising a ground portion and a notch portion; a radio circuit portion provided on the circuit substrate for supplying a high-frequency current to the notch portion; and a conductive bent-back portion formed so as to be connected to the ground portion and to extend the notch portion, on one end side of the circuit substrate.

According to the cellular phone of the present invention, the formation of the conductive bent-back portion which extends the notch portion leads to a reduction in the physical length of the notch portion functioning as a notch antenna, and also a reduction in the electrical length of the notch portion. The expression "a reduction in the electrical length of the notch portion" means that the formation of the notch portion produces the same effect as that obtained when a capacitor (capacitance) is interposed between the leading end of the bent-back portion and the circuit substrate, and, therefore, the substantial length of the notch portion is reduced. This makes it possible to reduce the size of the cellular phone and to enhance antenna efficiency.

The "antenna efficiency" means the ratio of an RF signal radiated from the antenna to an RF signal radiated from the radio circuit portion. For example, the case where the RF signal radiated from the radio circuit portion is entirely radiated from the antenna corresponds to an antenna efficiency of 100%.

BRIEF DESCRIPTION OF THE DRAWINGS

The above and other objects, features and advantages of the present invention will become apparent from the following description and appended claims, taken in conjunction with the accompanying drawings, wherein;

DESCRIPTION OF THE PREFERRED EMBODIMENTS

Figure 1:
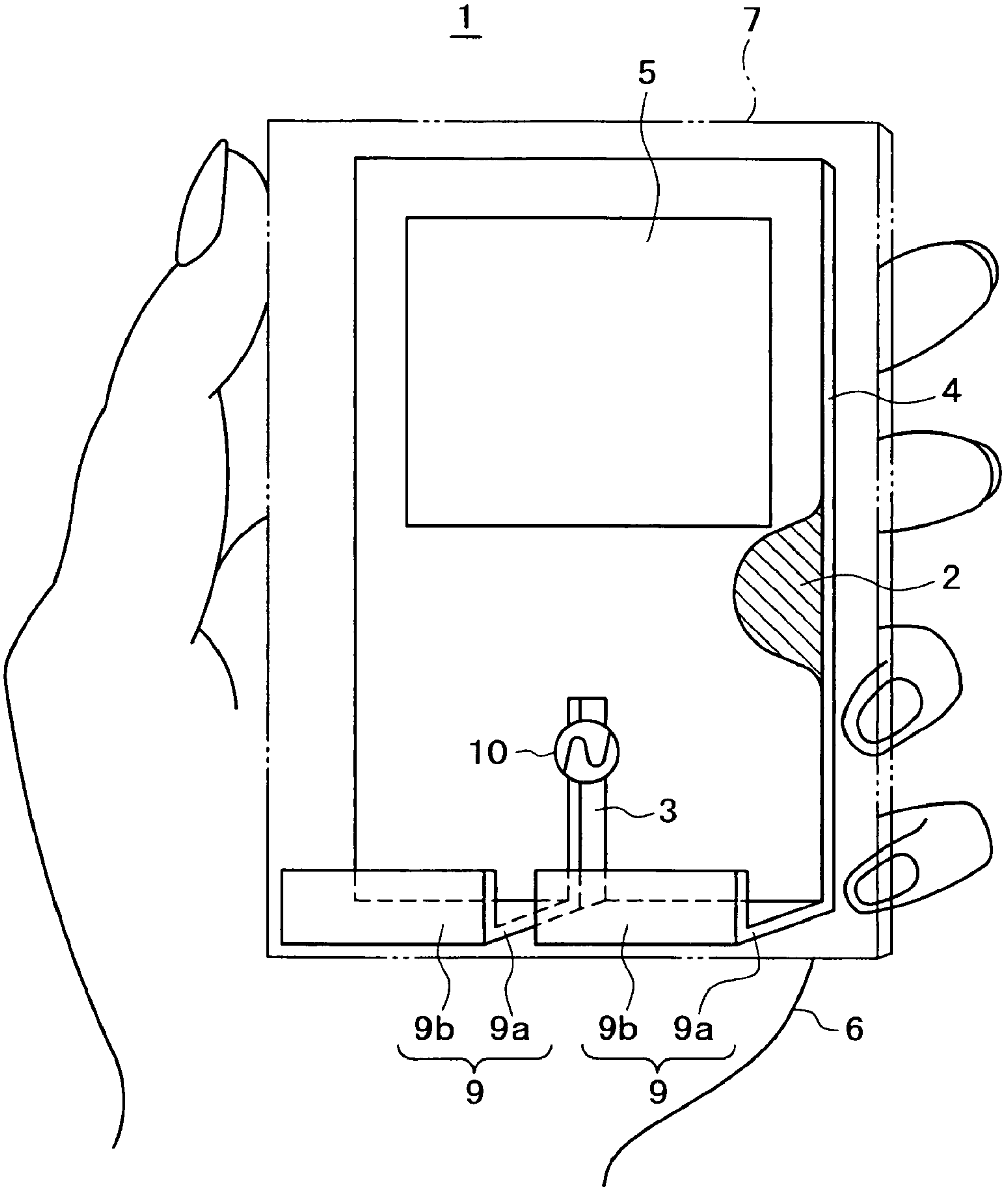
FIG. 1 is a perspective view illustrating an application of a radio device according to a first embodiment of the present invention to a cellular phone, which is held on a hand.

Now, some specific embodiments of the present invention will be described in detail below, referring to the drawings. The embodiments are examples of application of the radio device of the present invention to a cellular phone.

First Embodiment

Figure 2:
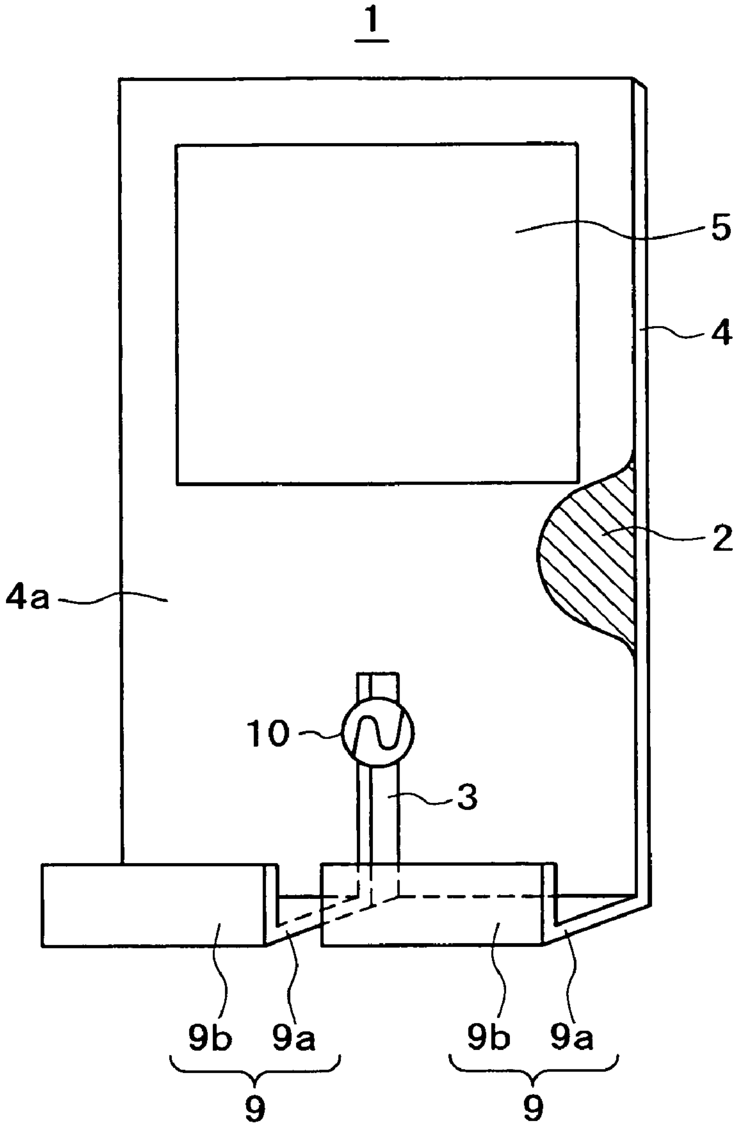
FIG. 2 is a perspective view of the radio device according to the first embodiment.

As shown in FIGS. 1 and 2, a radio device 1 according to this embodiment is a radio device in which a notch antenna is comprised of: a circuit substrate 4 comprising a ground portion 2 and a notch portion (slit) 3 opened at one end thereof; and a radio circuit portion 5 provided on the circuit substrate 4 for supplying a high-frequency current to the notch portion 3. The radio device 1 is incorporated in a casing 7 having such a size that it can be held on a hand 6, for example, and the radio device 1 is used as a radio device of a cellular phone.

The circuit substrate 4 is provided with circuit portions (omitted in the figure) for respectively driving a liquid crystal display device, a speaker, a microphone and the like necessary for the cellular phone, and the ground portion 2. The ground portion 2 functions as a ground conductor (ground plate) of a notch antenna, is formed as one layer in the circuit substrate 4 having a multilayer circuit structure comprising a lamination of a plurality of layers, for example, and is formed on the whole substrate surface inclusive of bent-back portions 9 which will be described later. FIGS. 1 and 2 are presented with a surface layer of the circuit substrate 4 being partly broken, and the ground portion 2 formed as a layer therebeneath is indicated by hatching. While the circuit substrate 4 in this embodiment has the multilayer circuit structure, a monolayer circuit substrate 4 may also be adopted, naturally.

In addition, the circuit substrate 4 is provided with a notch portion 3 which operates as a notch antenna. The notch portion 3 is formed as an oblong rectangular slit formed to penetrate in the thickness direction of the circuit substrate 4. Besides, the notch portion 3 is formed to extend straight from an intermediate position of the circuit substrate 4 toward one end side, and to continue to the position of the bent-back portions 9 which are formed by bending back the one end side of the circuit substrate 4. The notch portion 3 has its notch opened at end portions of the bent-back portions 9.

Figure 3:
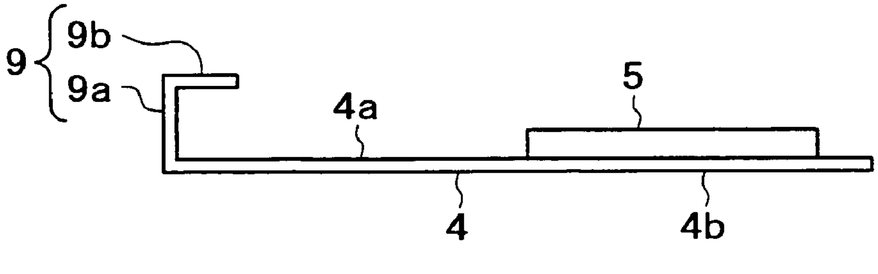
FIG. 3 is a side view of the radio device according to the first embodiment.

As shown in FIG. 3, each of the bent-back portions 9 is formed by integrally bending a portion (one end side portion) of the circuit substrate 4. The bent-back portion 9 is bent back to the side opposite to the side of mounting on a hand (palm) 6. Specifically, the bend-back portion 9 is comprised of: a perpendicular portion 9*a* rising to the side of one principal surface 4*a* of the circuit substrate 4 which is on the side opposite to the side of mounting on the hand 6 and on which a radio circuit portion 5 is formed; and a horizontal portion 9*b* extending from the leading end of the perpendicular portion 9*a* to the side of the radio circuit portion 5 (to the other end side of the circuit substrate 4).

The perpendicular portion 9*a* rises substantially perpendicularly to the one principal surface 4*a* of the circuit substrate 4. The horizontal portion 9*b* extends substantially in parallel to the one principal surface 4*a*, from the leading end of the perpendicular portion 9*a* toward the side where the radio circuit portion 5 is provided. The bent-back portions 9 each comprised of the perpendicular portion 9*a* and the horizontal portion 9*b* are provided on one end side of the circuit substrate 4 in a roughly inverted L shape relative to the circuit substrate 4. The ground portion 2 is formed to continue to the positions of the leading ends of the bent-back portions 9.

The radio circuit portion 5 is an RF circuit used in an ordinary cellular phone, and is a circuit for transmitting or receiving a high-frequency signal through the antenna. An RF signal from the radio circuit portion 5 is radiated from the notch portion 3, by supplying a current with a desired position of the notch portion 3 as a feeder portion 10 through a feeder line which is omitted in the figures.

According to the radio device 1 constituted as above, the open end portion of the notch portion 3 which functions as a notch antenna is bent back, so that the antenna is less susceptible to the influence of the hand 6, resulting in that gain is enhanced. In addition, by bending back the open end portion of the notch portion 3, the whole length of the notch portion 3 inclusive of the bent-back portions 9 can be reduced both on a physical basis and on an electrical basis.

Figure 4:
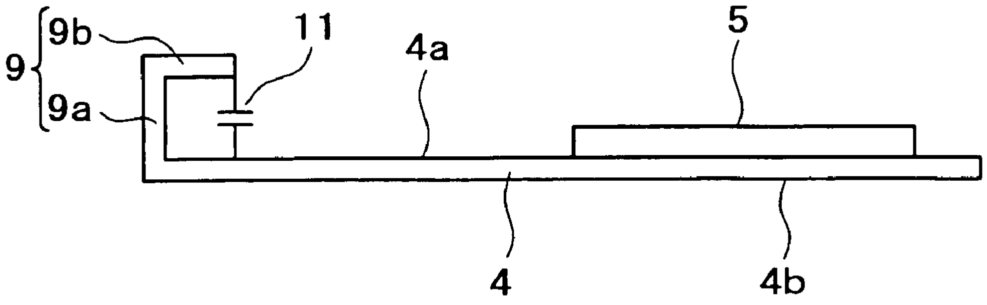
FIG. 4 is a side view of the radio device according to the first embodiment, illustrating that the length of a notch portion can be reduced by bending back an open end portion of a notch antenna.

To be more specific, in the case of an ordinary notch antenna, ¼ wavelength (λ) of the wavelength λ of a frequency used for the cellular phone is made to be the length of the notch portion 3, and the circuit substrate 4 is provided with a straight groove in a flat surface. When the open end portion of the notch portion 3 is bent back, the length of the notch portion 3 is substantially reduced by an amount corresponding to the bent-back portion. In addition, as shown in FIG. 4, the same effect as that obtained by interposing a capacitor (capacitance) 11 is generated between the leading end of the bent-back portion 9 (the leading end of the horizontal portion 9*b*) and the one principal surface 4*a* of the circuit substrate 4, so that the length of the notch portion 3 inclusive of the bent-back portions 9 (the whole length) is reduced. In short, the length of the notch portion 3 can be made substantially smaller than the length corresponding to ¼ wavelength of the wavelength λ of the frequency used for the cellular phone. Therefore, according to the radio device 1 in the first embodiment, it is possible to render the antenna smaller in size.

Here, in order to achieve a further reduction in the size of the radio device 1, it may be contemplated to charge a dielectric material in the notch portion 3. With a dielectric material charged in the notch portion 3, the physical length of the notch portion 3 can be reduced owing to a wavelength-shortening effect of the dielectric material. When the dielectric material is charged in the notch portion 3, however, there arises the problem that antenna efficiency is deteriorated. A simulation example of this problem is shown in FIG. 5.

Figure 5:
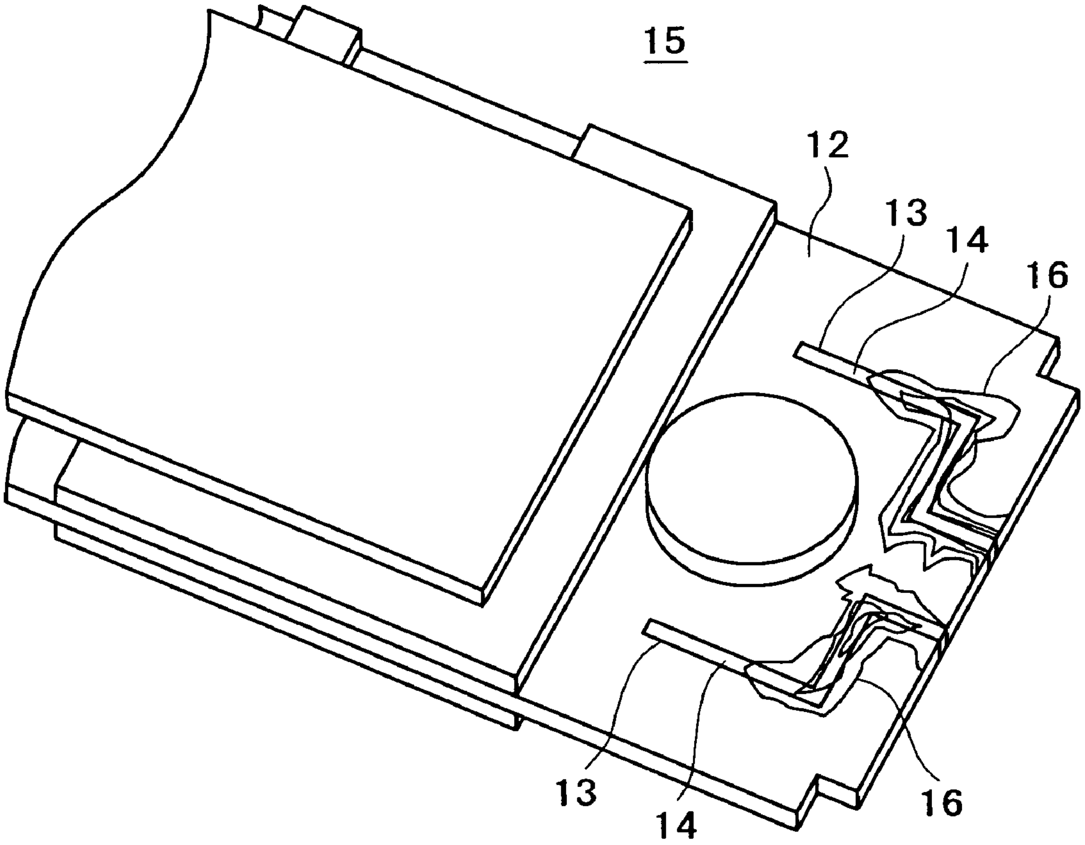
FIG. 5 shows a simulation example for illustrating that antenna efficiency is deteriorated when a dielectric material is charged in a notch portion and that a loss is generated at a portion near the open end of the notch portion.

FIG. 5 shows a radio device 15 in which a notch antenna is constituted by providing a circuit substrate 12 with crank-shaped notch portions 13 and filling the notch portions 13 with a dielectric material 14; in the figure, the portions where a loss is generated are indicated by contour lines 16. As seen from FIG. 5, it is confirmed that the loss is generated at portions near the open ends in the dielectric material 14 charged in the notch portions 13 (the contour lines 16 are concentrated at the portions).

Figure 6:
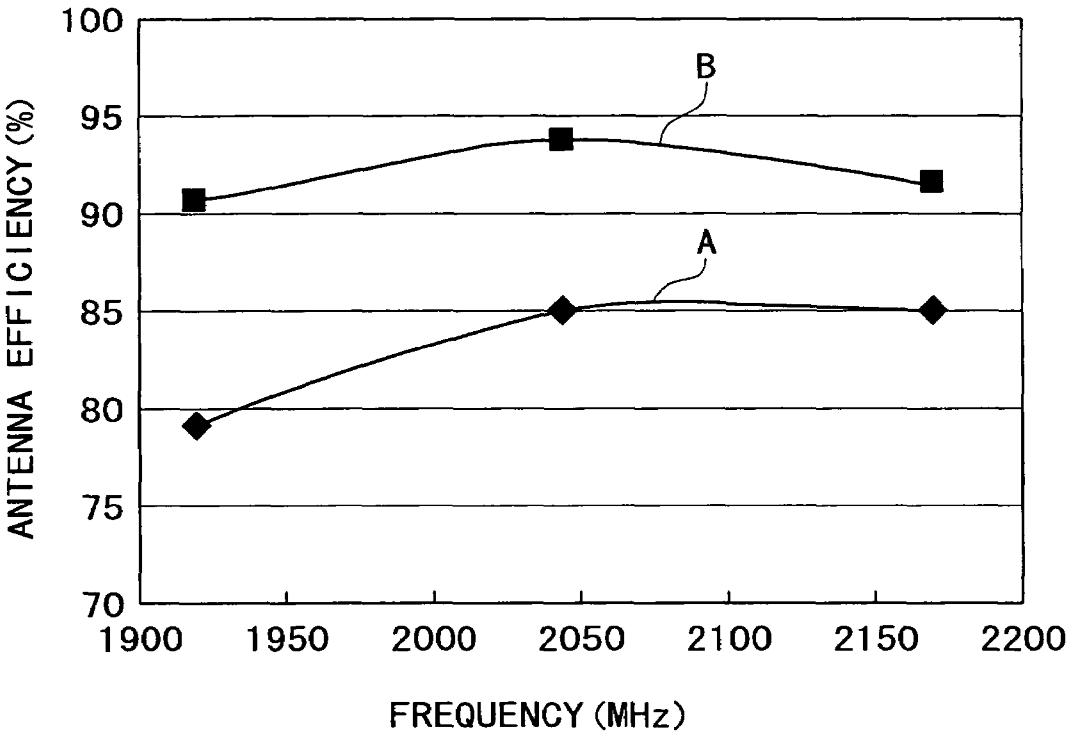
FIG. 6 is a characteristic diagram showing simulation results relating the variations in antenna efficiency in the case where the dielectric material is charged in the notch portion and in the case where the dielectric material is not charged.

An example of simulation results relating to variations in antenna efficiency, in the case where the dielectric material 14 is charged in the notch portions 13 and in the case where the dielectric material 14 is not charged, is shown in FIG. 6. In FIG. 6, line A corresponds to a radio device 15 in which a glass-epoxy resin as the dielectric material 14 is charged in the notch portions 13, and line B corresponds to the radio device 1 according to the first embodiment in which nothing is charged in the notch portion 13.

It is seen from FIG. 6 that the radio device 1 with nothing charged in the notch portion 3 (the radio device 1 according to the first embodiment) shows an about 8% improvement in antenna efficiency, as compared to the radio device 15 with the dielectric material 14 charged in the notch portions 13.

In addition, the radio device 1 according to the first embodiment was produced with a 2 GHz band, and gain measurement results at the time of talking in the case where the radio device 1 is incorporated in a casing on the side of key buttons of a cellular phone capable of being folded in two were examined. The object of comparison was a notch antenna in which the open end portion was not bent, and the differences in antenna efficiency were compensated, to compare only the amount of deterioration of gain due to the human body. The positional relationship between the bent antenna and the hand 6 of the testee is shown in FIG. 1. The results of various terminal-holding modes supposed at the time of talking by three testees showed that the radio device 1 according to the first embodiment gave a higher gain, higher by an average of about 4 dB in horizontal-plane averaged gain (cross polarization ratio: 6 dB).

Thus, according to the radio device 1 in the first embodiment, by bending back the open end portion of the notch antenna it is possible to reduce the size of the antenna, and it is possible to enhance antenna efficiency with a simple structure. Furthermore, it is possible to reduce deterioration of gain due to the human hand holding the cellular phone or the like.

Second Embodiment

Figure 7:
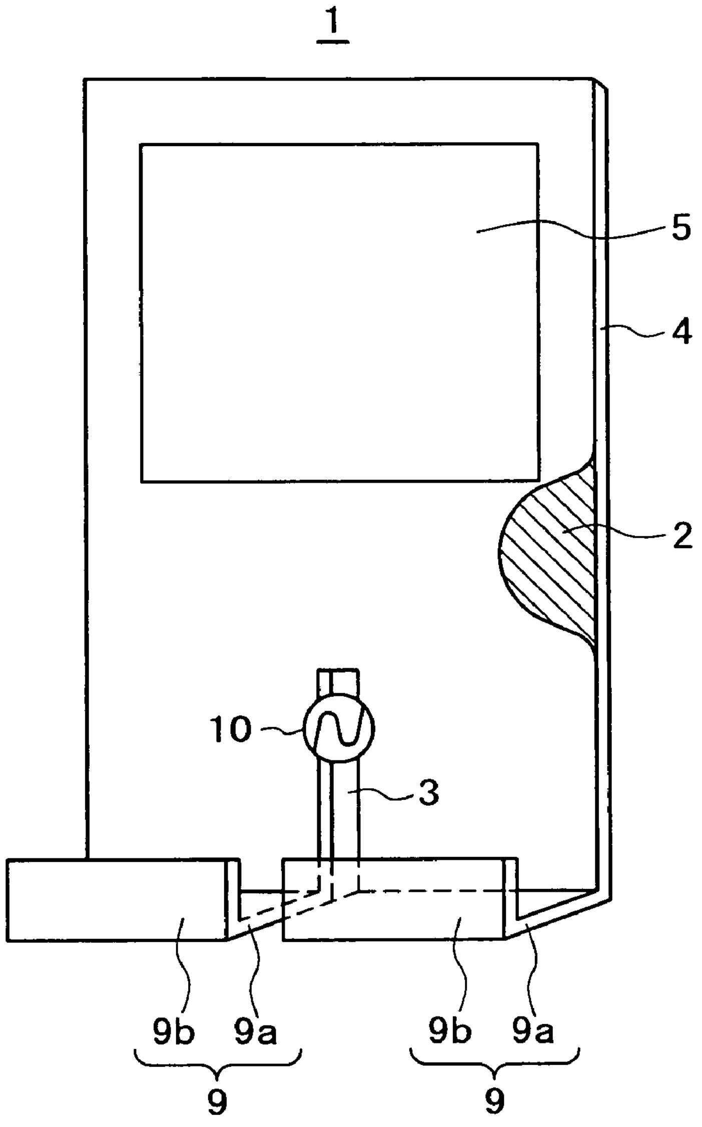
FIG. 7 is a perspective view of a radio device according to a second embodiment of the present invention.
Figure 8:
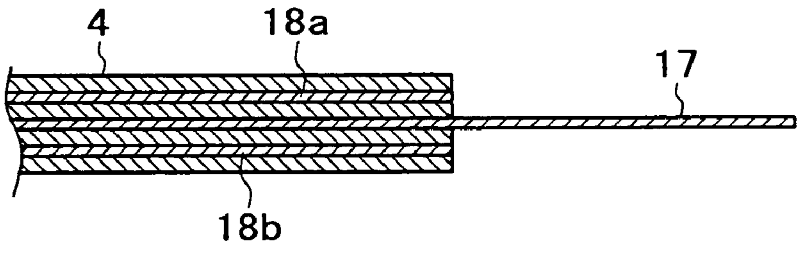
FIG. 8 is a sectional view of a circuit substrate of the radio device according to the second embodiment, the circuit substrate having a multilayer structure in which one layer is a flexible printed cable.

As shown in FIGS. 7 and 8, a radio device 1 according to the second embodiment has a structure wherein a circuit substrate 4 has a multilayer structure, in which one layer is a flexible printed cable 17, and the flexible printed cable 17 is bent to form bent-back portions 9. The other points of constitution are the same as in the radio device 1 according to the first embodiment, so that the same components as those in the first embodiment are denoted by the same symbols as above, and description thereof is omitted.

As shown in FIG. 8, the circuit substrate 4 of the radio device 1 according to the second embodiment is a so-called multilayer substrate in which a plurality of wiring circuits 18*a* and 18*b* are formed in a lamination direction. Of the layers thus laminated, one layer is the flexible printed cable 17. The flexible printed cable 17 is composed of a flexible cable, and, for example, has a conductive pattern of copper on the whole cable surface. On the conductive pattern, an insulating layer may be provided.

Like in the radio device 1 in the first embodiment, the flexible printed cable 17 is bent to form the bent-back portions 9 at one end portion thereof. In addition, the flexible printed cable 17 is connected, on a high-frequency basis, to a ground portion 2 formed in the circuit substrate 4. Here, the expression "connected, in a high-frequency basis" means that a high-frequency current is supplied from a radio circuit portion 5 to the flexible printed cable 17 through the ground portion 2.

Incidentally, since the flexible printed cable 17 is flexible, it is difficult for the bent-back portions 9 to maintain their shape by themselves; therefore, a form maintaining member (omitted in the figures) for forcibly maintaining the shape of the bent-back portions 9 is utilized. The form maintaining member is preferably formed of an insulating resin so that a short-circuit is not generated between the form maintaining member and a conductor formed on the flexible printed cable 17 or the like.

Thus, in the radio device 1 according to the second embodiment, the bent-back portions at the open end portion of the notch antenna are composed of the flexible printed cable 17, so that it is possible to realize a lighter weight and a lower cost, and to enhance the degree of freedom in design of the cellular phone.

Third Embodiment

Figure 9:
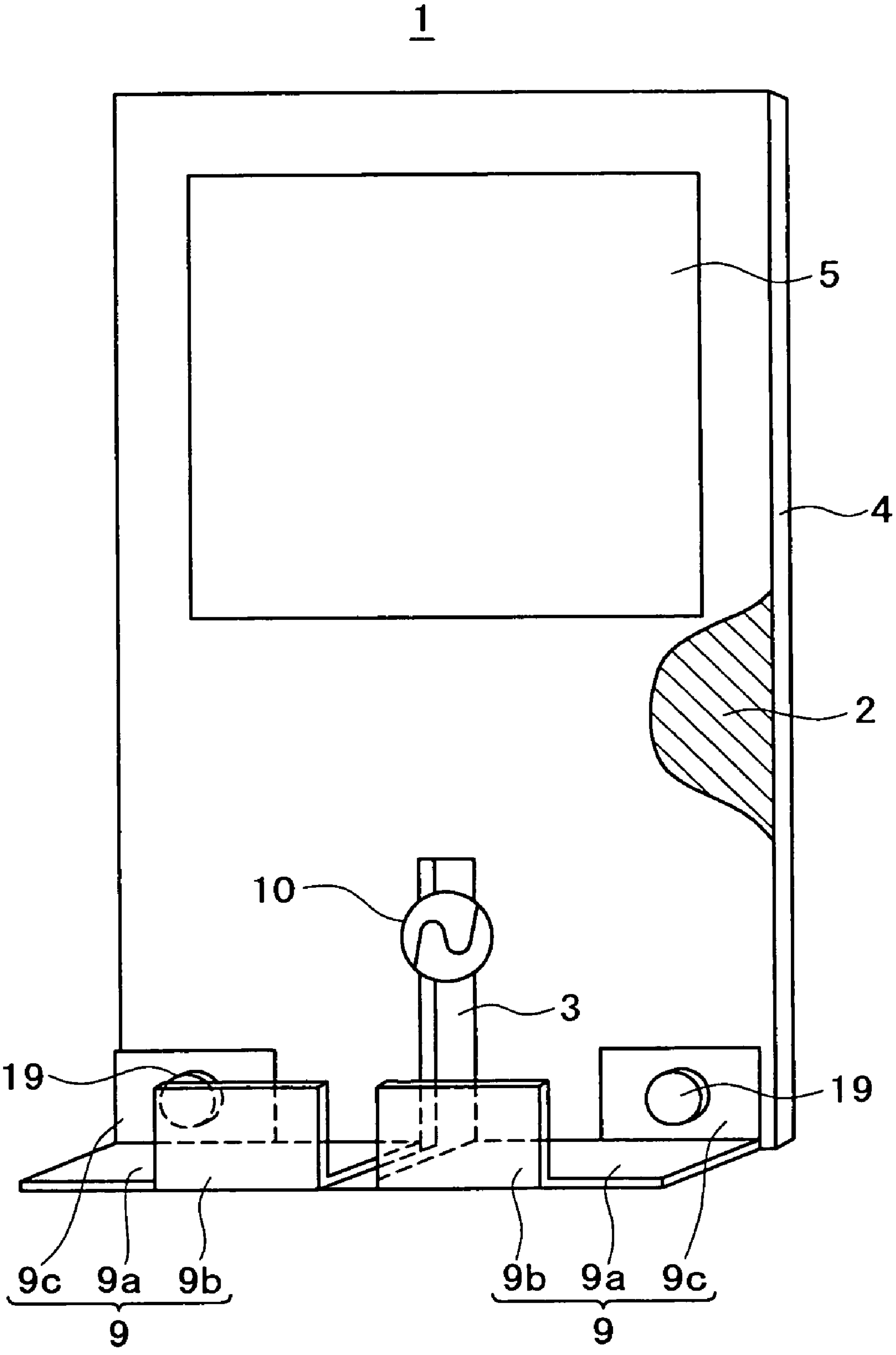
FIG. 9 is a perspective view of a radio device according to a third embodiment of the present invention.

A radio device 1 according to a third embodiment has a structure in which a metallic plate is bent to form bent-back portions 9, as shown in FIG. 9. The other points of constitution are the same as in the radio device 1 according to the first embodiment, so that the same components as those in the first embodiment are denoted by the same symbols as above, and description thereof is omitted.

In the radio device according to the third embodiment, as shown in FIG. 9, a metallic plate formed of a conductive material, for example a copper plate, is bent to form the bent-back portions 9, in the same manner as in the radio device 1 according to the first embodiment. Each of the bent-back portions 9 comprises a perpendicular portion 9*a* and a horizontal portion 9*b*, in the same manner as in the radio device 1 according to the first embodiment, and additionally comprises a contact portion 9*c* for contact with a ground portion 2.

In the third embodiment, the contact portion 9*c* is brought into close contact with the ground portion 2, and thereafter the bent-back portions 9 are fixed to a circuit substrate 4 by screws 19 for fixing both a casing 7 for containing the radio device 1 therein (the casing 7 is omitted in FIG. 9) and the circuit substrate 4. Since the bent-back portions 9 are fixed to the circuit substrate 4 by utilizing the screws 19 for fixing the casing 7 and the circuit substrate 4, the contact portions 9*c* can be fixed in close contact with the ground portion 2, to achieve grounding assuredly. Besides, since the bent-back portions 9 are fixed to the circuit substrate 4 by use of the screws 19 for fixing the casing 7 and the circuit substrate 4, it is possible to achieve a reduction in size of the mounting area.

Fourth Embodiment

Figure 10:
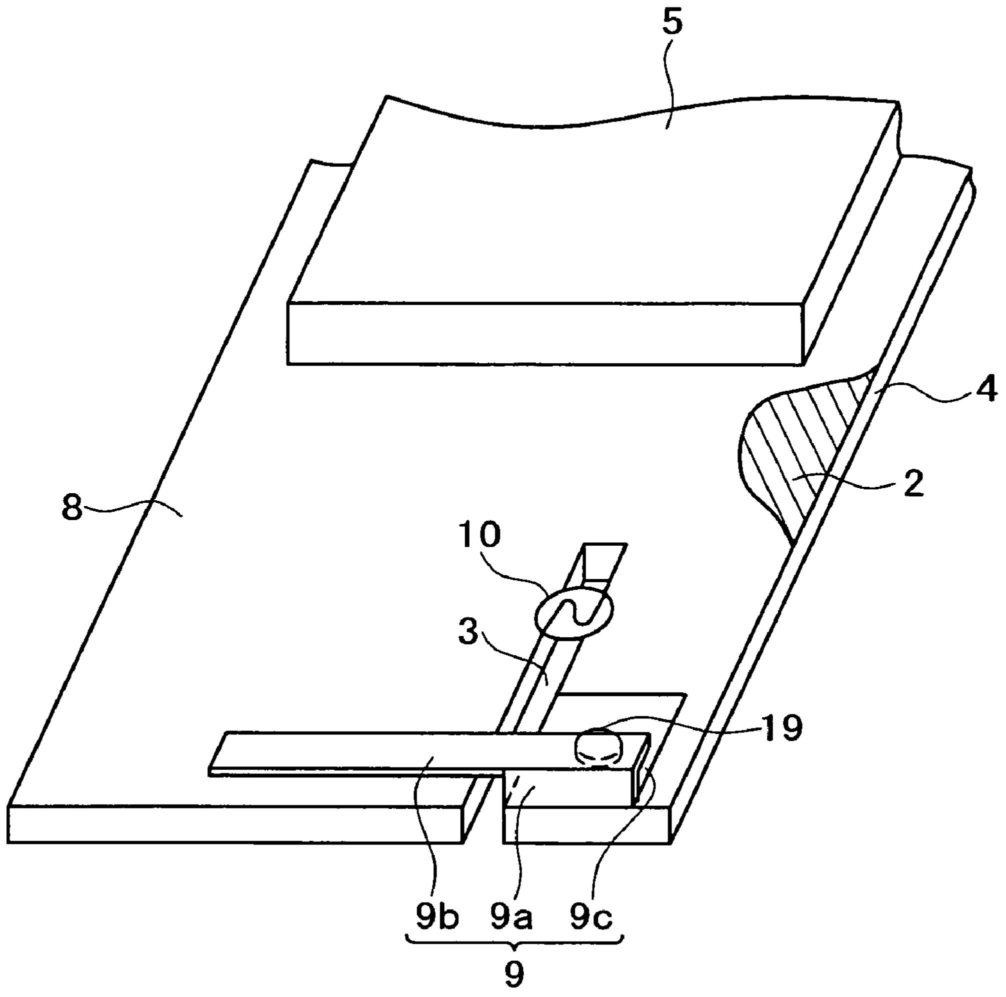
FIG. 10 is a perspective view of a radio device according to a fourth embodiment of the present invention.
Figure 11:
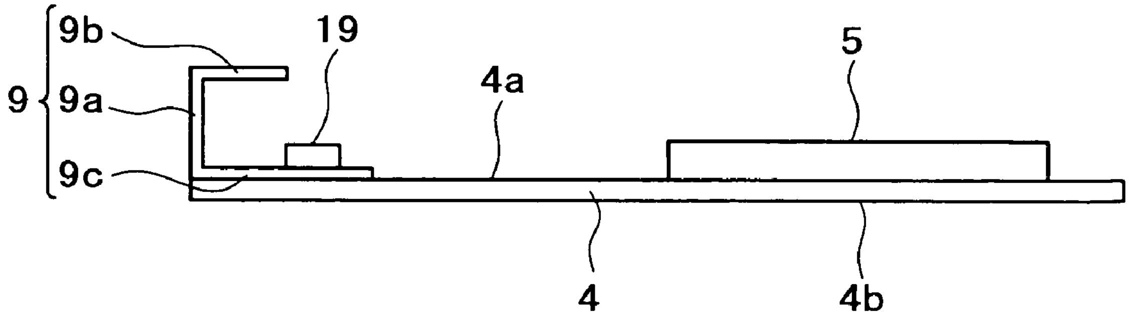
FIG. 11 is a side view of the radio device according to the fourth embodiment.

As shown in FIGS. 10 and 11, a radio device 1 according to a fourth embodiment has a structure in which a metallic plate is bent to form a bent-back portion 9, the shape of the bent-back portion 9 being different from that in the radio device 1 according to the third embodiment. The other points of constitution are the same as in the radio device 1 according to the third embodiment, so that the same components as those in the third embodiment are denoted by the same symbols as above, and description thereof is omitted.

The bent-back portion in the radio device 1 according to the fourth embodiment is comprised of: a perpendicular portion 9*a* rising substantially perpendicularly on the side of one principal surface 4*a* of a circuit substrate 4; a parallel portion 9*b* substantially parallel to the circuit substrate 4 and extending from the leading end of the perpendicular portion 9*a* in a direction substantially orthogonal to the notch direction of a notch portion 3 (the longitudinal direction of the slit); and a contact portion 9*c* for contact with a ground portion 2. The parallel portion 9*b* is formed as a flat plate having an oblong rectangular shape, and is formed to cross the notch portion 3.

Figure 12:
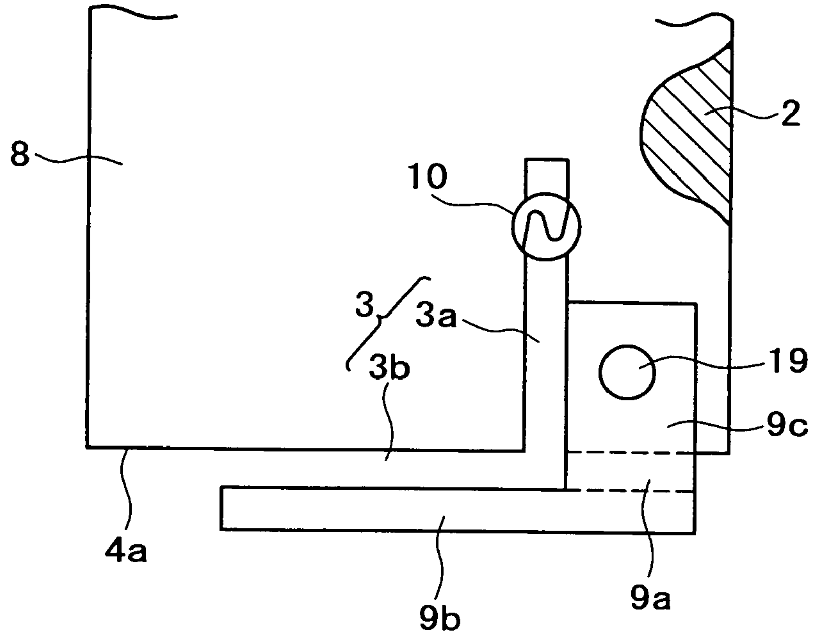
FIG. 12 is a plan view showing, in a developed state, a bent-back portion of the radio device according to the fourth embodiment.

FIG. 12 is a plan view showing the bent-back portion 9 in a developed state. When the bent-back portion 9 is developed, the notch portion 3 is formed in a roughly L shape in plan view, composed of a straight-shaped groove portion 3*a* formed in the circuit substrate 4, and a parallel groove portion 3*b* formed between one end 4*a* of the circuit substrate 4 and the parallel portion 9*b*. Namely, a notch antenna can be constituted by forming the bent-back portion 9 in this manner.

Fifth Embodiment

Figure 13:
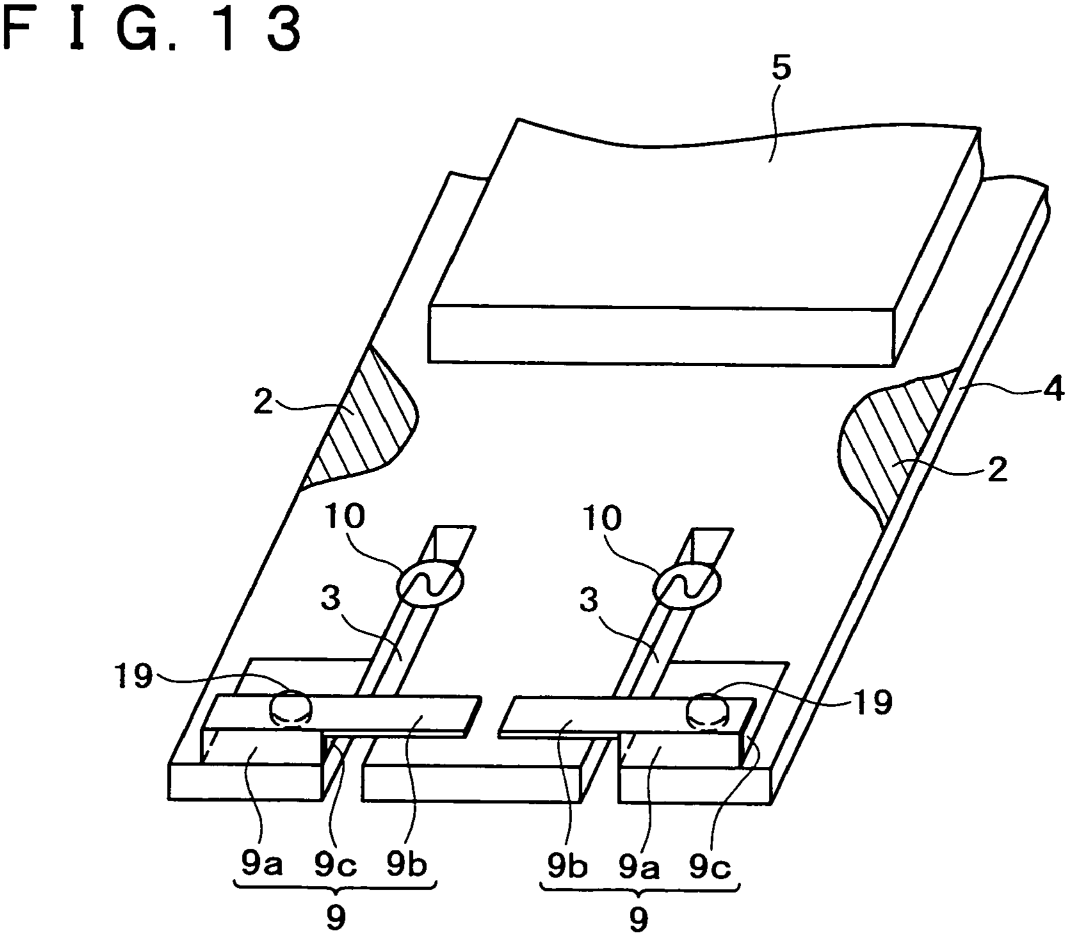
FIG. 13 is a perspective view of a radio device according to a fifth embodiment of the present invention.

A radio device 1 according to a fifth embodiment has a structure in which another bent-back portion 9 being the same as the bent-back portion 9 in the radio device 1 according to the fourth embodiment is additionally provided on the same circuit substrate 4, as shown in FIG. 13. Namely, the radio device 1 according to the fifth embodiment is a radio device comprising two notch antennas on the circuit substrate 4.

Other Embodiments

While the specific embodiments of the present invention have been described above, the invention is not limited to the above embodiments, and various modifications are possible within the scope of the invention.

Besides, while the cellular phone has been described as an example in the above embodiments, the present invention is not limited to the cellular phone, and the same functions or effects can be obtained when the invention is applied to, for example, a cordless phone, a hand-held PC, or a portable communication terminal device such as a PDA (Personal Digital Assistant) having a communication function.

What is claimed is:

1. A radio device, comprising:

a notch antenna, wherein said notch antenna includes:

a circuit substrate comprising a ground portion, and a notch portion opened at one end thereof;

a radio circuit portion provided on said circuit substrate for supplying a high-frequency current to said notch portion;

a conductive bent-back portion formed on said one end side of said circuit substrate and configured to be connected with said ground portion and to extend said notch portion;

a perpendicular portion rising substantially perpendicularly to said circuit substrate; and a parallel portion substantially parallel to said circuit substrate, said parallel portion formed so as to extend from the leading end of said perpendicular portion in a direction substantially orthogonal to the notch direction of said notch portion and to cross said notch portion.

2. A radio device as set forth in claim 1, wherein said bent-back portion is formed by integrally bending a portion of said circuit substrate.

3. A radio device as set forth in claim 1, wherein said circuit substrate has a multilayer structure in which one layer is a flexible printed cable, and said bent-back portion is formed by bending said flexible printed cable.

4. A radio device as set forth in claim 1, wherein said bent-back portion is formed by bending a metallic plate.

5. A radio device as set forth in claim 4, wherein said bent-back portion is fixed to said circuit substrate by a screw for fixing both a casing for containing said radio device therein and said circuit substrate.

6. A radio device as set forth in claim 1, wherein said circuit substrate comprises two notch portions, and said bent-back portion is provided to correspond to each of said notch portions.

7. A radio device as set forth in claim 6, wherein both of said notch portions are provided on said one end side of said circuit substrate.

8. A radio device as set forth in claim 1, wherein said bent-back portion is bent back to the side on which said radio circuit portion is provided, of said circuit substrate.

9. A cellular phone comprising:

a casing, a circuit substrate incorporated in said casing and including a ground portion and a notch portion, a radio circuit portion provided on said circuit substrate for supplying a high-frequency current to said notch portion, a conductive bent-back portion formed on one end side of said circuit substrate and configured to be connected with said ground portion and to extend said notch portion;

a perpendicular portion rising substantially perpendicularly to said circuit substrate; and a parallel portion substantially parallel to said circuit substrate, said parallel portion formed so as to extend from the leading end of said perpendicular portion in a direction substantially orthogonal to the notch direction of said notch portion and to cross said notch portion.

10. A cellular phone as set forth in claim 9, wherein said bent-back portion is formed so as to be bent back to the side opposite to the side of a hand when said cellular phone is held on the hand.

* * * * *